United States Patent [19]
Martin

[11] 3,779,913
[45] Dec. 18, 1973

[54] WATER TREATMENT

[76] Inventor: Waylan C. Martin, P.O. Box 1468, Monahans, Tex. 79756

[22] Filed: June 6, 1972

[21] Appl. No.: 260,316

[52] U.S. Cl................ 210/63, 210/220, 261/121 R
[51] Int. Cl............................................... C02b 1/28
[58] Field of Search...................... 210/220, 15, 192, 210/221, 63; 261/81, 121 R, 124

[56] References Cited
UNITED STATES PATENTS

| | | | |
|---|---|---|---|
| 3,246,885 | 4/1966 | Stevens.............................. | 210/220 |
| 3,388,057 | 6/1968 | Callahan.............................. | 210/15 |
| 3,421,625 | 1/1969 | Fritz................................... | 210/192 |
| 2,776,820 | 1/1957 | Bond.............................. | 261/121 R |

*Primary Examiner*—Frank A. Spear, Jr.
*Assistant Examiner*—Benoit Castel
*Attorney*—Charles W. Coffee

[57] ABSTRACT

To oxidate materials in water, a chamber is filled with air. Thereafter, raw water is pumped in, thus, compressing the air. Then the air from the top of the vessel is pumped to an air diffusion plate at the bottom. The operation is continued as a batch operation for the desired length of time and, thereafter, the treated water removed from the chamber.

13 Claims, 5 Drawing Figures

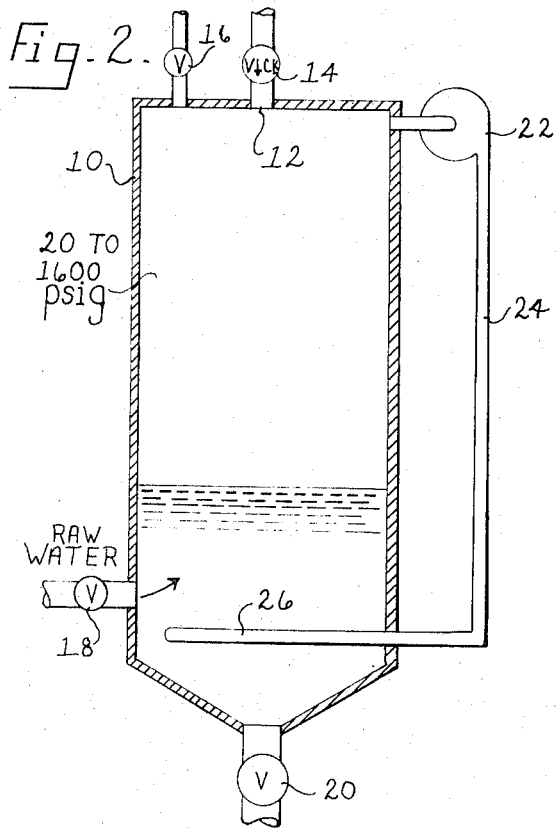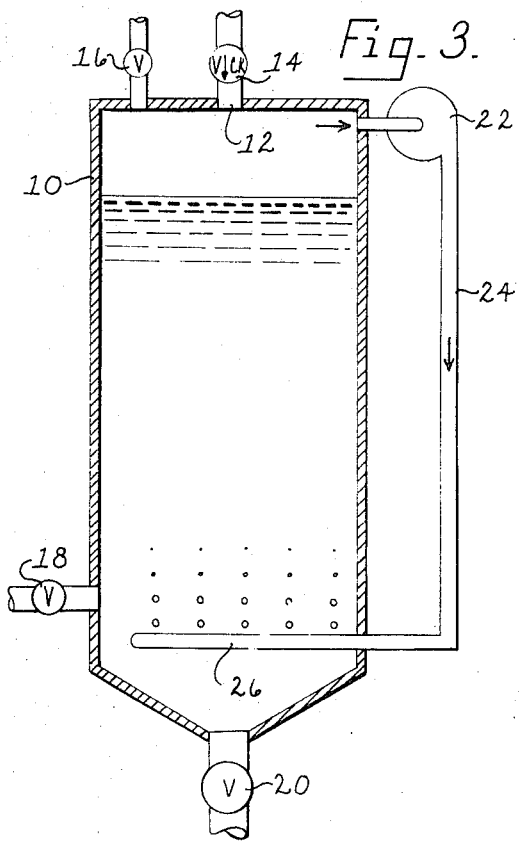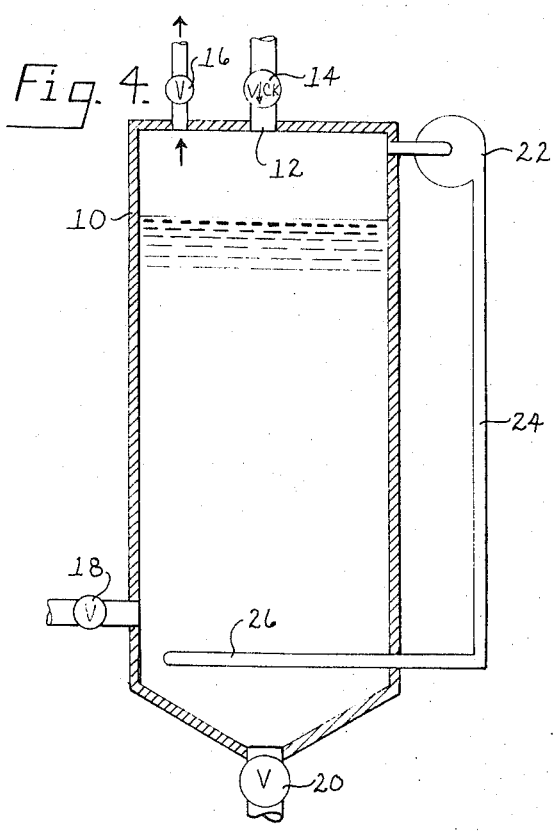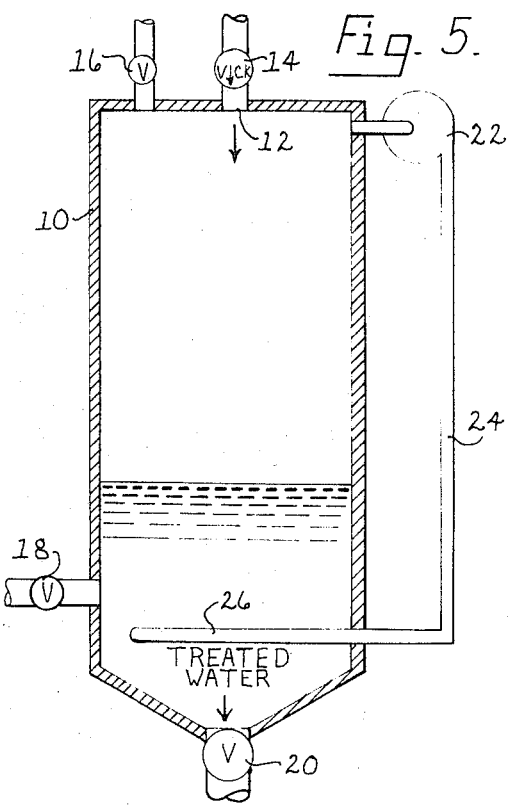

WATER TREATMENT

BACKGROUND OF THE INVENTION

1. Field of the Invention

One of the primary problems with waste waters is the fact that they commonly contain an oxygen demand that involves immediate dissolved oxygen demand, chemical oxygen demand, and biochemical oxygen demand. These oxygen demands will render a waste water significantly undesirable for many reasons. In addition to this, frequently, oxidizable material in water is removed by extensive aeration at atmosphere and retention time for complete oxidation is considerable. There are many other circumstances in which oxidizable material in waters need to be neutralized and/or precipitated. This process is to provide an economical, rapid, and flexible method of oxidizing materials in water for whatever reason.

This invention relates to aerating water in a pressure container on a batch operation.

2. Description of the Prior Art

In commercial practice today, water is normally aerated in one of two ways. Either the water is sprayed into the air as a fountain to be contacted with the air for aeration at atmospheric pressure or air is pumped underneath the surface of a pond at atmospheric pressure or at whatever pressure as is necessary to cause the air to emerge.

In other processes for contacting gas and liquids, e.g., on a laboratory basis, it has been suggested that they be sealed where either the gas or liquid should not be permitted to escape into the atmosphere. In such cases, it has been suggested that the circulation be done in a sealed chamber and the gas recirculated. However, there is no suggestion that this be done on a large scale basis for the treatment of water. An example of such device is shown in the patent to HEDEN, U.S. Pat. No. 2,995,497.

Also, it has been suggested that water be treated while under pressure, however, to my knowledge under the prior systems it was always suggested that all the air pass through the water only once and not recirculate; therefore, necessitating continued compression of the air. STEVENS, U.S. Pat. No. 3,246,885 shows continuous compression of air.

Other U.S. Pat. Nos. considered in the preparation of this application include:
Deutsch; 553,641,
Vosmaer; 709,379,
Luther; 2,095,338,
Fisher; 2,165,889,
Klein; 2,352,901,
Bond; 2,776,820,
Bill; 2,778,681.

SUMMARY OF THE INVENTION

1. New and Different Function

Basically the process involves the recirculation of the compressed air so it is not necessary to repeatedly compress air to bubble through the water. In addition, the process includes the initial compression primarily by the pumping of the water, although the air could be at least partially compressed before being charged into the vessel.

The currently known advantages of this process over any other known process are as follows:

1. Little or no cost is involved in providing the initial compressed air to the reaction chamber. The volume of air required is relatively low and there is no need for any continuous application or metering of air. The additional cost of circulating the air within the high pressure area would be very low as compared to compressing air.

2. A moderately low cost of pressuring the water is involved, in that the average pressure against which the water is pumped in this process is much less than one-half the final reaction pressure. In explanation to this, when the reaction chamber is one-half full the pressure will be only approximately twice as high as the initial pressure applied on step 1, etc., until the last small portion of water that goes into the reaction chamber will actually be pressured at the reaction pressure.

3. Hyperoxygenation is provided at the reaction pressure. This refers not to the fact that more oxygen is in solution at the reaction pressure so much as it refers to the fact that there is substantially more oxygen than this continuously in the water in this process. To explain, as the pressure increases, the solubility of oxygen increases; but this process provides much more than the soluble oxygen at the reaction pressure, thus referred to as hyperoxygenation.

4. As oxygen reacts with the oxygen demand, it is used up and this process provides a continuous replacement of the reacted oxygen.

5. Under some conditions, this process provides a lethal effect on microorganisms.

6. Though previous processes have used the fact that an increased pressure accelerates reaction, it has not actually been a part of any previous known process. This refers only to the actual use of pressure to accelerate a reaction.

7. This process is not limited to the sole purpose of eliminating oxygen demand but may also provide commercial products or byproducts from the oxidation of water contents.

2. Objects of this Invention

An object of this invention is to aerate water to provide oxygen to meet any one, two, or three oxygen demands, which are: the immediate dissolved oxygen demand, the chemical oxygen demand and the biochemical oxygen demand.

Other objects are to achieve the above with equipment that is sturdy, compact, durable, simple, safe, efficient, versatile, and reliable, yet inexpensive and easy to manufacture, install, operate, and maintain.

Still other objects are to achieve the above with a method that is versatile, rapid, efficient, and inexpensive, and does not require skilled people to install, adjust, operate, and maintain.

The specific nature of the invention, as well as other objects, uses, and advantages thereof, will clearly appear from the following description and from the accompanying drawing.

BRIEF DESCRIPTION OF THE DRAWING

FIGS. 1 through 5 show schematically a pressure vessel used to practice this invention with the associated equipment. The drawings in sequence show basically the steps used in practicing the invention.

DESCRIPTION OF THE PREFERRED EMBODIMENT

Equipment

Figure 1:
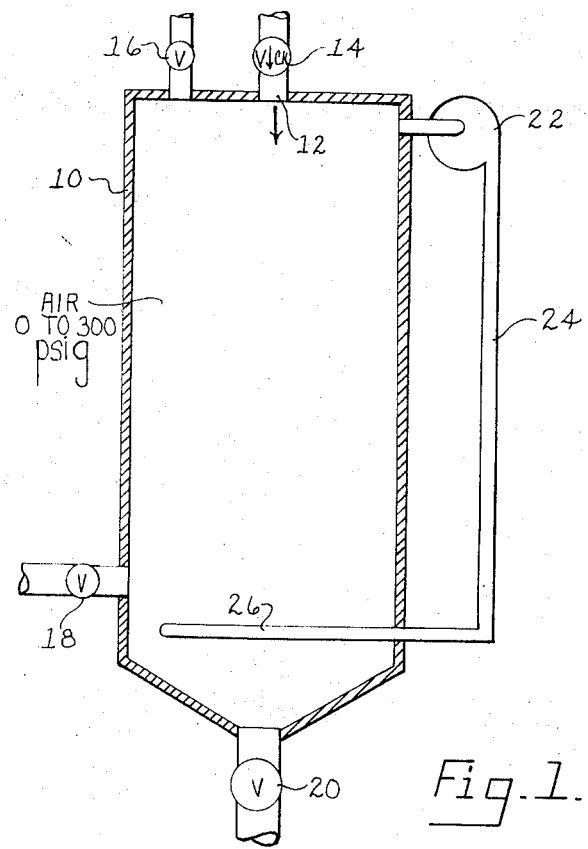

As seen in the accompanying drawing, the equipment includes pressure vessel 10. At the top, the vessel has air intake opening 12 equipped with check valve 14. Also in the top of the vessel 10 is a waste air or nitrogen release opening equipped with valve 16. Near the bottom of the vessel, there is a raw water inlet equipped with valve 18. The treated water outlet with valve 20 is illustrated in the bottom of the vessel 10. As discussed in detail later, in certain instances, it might be desirable that the water outlet not be located at the extreme bottom of the vessel 10.

Air blower 22 is located within air circulation pipe 24 which has its inlet at or near the top of the vessel 10 so it takes air from above the liquid level of the top of the vessel and blows through the blower 22 to be dispensed into air diffusion plate 26 which is close to the bottom of the vessel 10. As may be seen, the vessel is in the form of a cylinder having a vertical axis and the height is greater than the diameter.

Operation

The following are steps of operation:

STEP 1 (FIG. 1)

Air is placed in the vacant reaction chamber or vessel 10. The amount of air is regulated by the pressure applied to the incoming air. This may vary from atmosphere pressure to essentially unlimited upper ranges of pressure as will be dictated by the demands of the water to be treated. The air requirement of the water will depend on the oxygen demand of the water and also the volume to be treated in the reaction chamber in any one cycle. The pressure of the air and, consequently, the oxygen provided for the reaction can be adjusted to a point that is commensurate with the variations in the requirements of the water being treated. After a desired amount of air and pressure is provided, the air inlet valve 14 shuts in preparation for step 2. Though not limited to this, experiments to date have shown that it is desirable that the inlet air through air check valve 14 be either from atmospheric pressure up to 300 psig.

STEP 2 (FIG. 2)

The raw water to be treated is pumped into the reaction chamber 10 in the desired quantities through raw water inlet valve 18. The pumping in of the raw water builds up adequate pressure that will be required to accomplish the desired reaction. The volume of the water that is required to reach the reaction pressure is provided with consideration that the pressure will decline slightly during the reaction period. The pressure against which the water will be pumped into the reaction chamber will average much less than half-way between the initial air pressure and the final pressure. This is to say that in the initial commencing of the pumping of the water into this reaction chamber, the resistance of the pressure will be that of the initial air pressure; whereas, the final quantity pumped into the reaction chamber will be at the desired reaction pressure. The amount of water pumped into the reaction chamber can be adjusted from time to time to provide another flexibility in accommodating variations in the requirements of the water being treated. The circulating blower 22 may operate during this step 2 if it is warranted by circumstances of the treating. At the desired reaction pressure, the incoming raw water valve 18 is closed in preparation for step 3. Though not limited to this, experiments have included a reacting pressure ranging from 20 psig to 3,000 psig. However, it would appear that commercial practice would seldom require reaction pressures over 1,600 psig.

STEP 3 (FIG. 3)

If the circulating blower 22 has not already been started in step 2, then it commences operation at this time to circulate the air in the area above the water down to underneath the water so that this air will gradually make its way up through the water in the reaction chamber 10. This circulating blower 22 or other air-moving device has only to build up enough pressure to overcome the head of water in the reaction chamber and to provide the desired rate of air circulation. The shell of this circulating equipment (blower 22) must withstand the operating pressure, but it is not actually involved in pressurizing the air other than the above mentioned necessity to maintain circulation. The reaction chamber 10 may be provided with either baffling or an evenly distributed suction to the circulating blower 22 to avoid dead air spaces in the top of the reaction chamber 10. Any known device of distributing air evenly into the water can be used for the air diffusion plate 26 as shown in the drawings. The time and rate of the circulation of the air can be adjusted to the requirements of the water being treated. For different processes, the times may be as short as 5 minutes or as long as 60 minutes. The pressure in the reaction chamber 10 will decline slightly during this period due to the dissolving and consumption of oxygen from the air. This circulation will provide a continuous replacement of oxygen in the water as the oxygen reacts with oxygen demand in the water. This is the step in which the actual reaction to neutralize the oxygen demand takes place. The circulation can be discontinued at the end of the required circulating time or it may be continued into the next step as required.

STEP 4 (FIG. 4)

The vent or nitrogen valve 16 on the reaction chamber 10 is opened to evacuate the residual nitrogen and oxygen-deficient air left in the top of the reaction chamber 10. This step is optional in that the primary objective of this step is to eliminate nitrogen and oxygen-deficient air from the reaction chamber 10 in preparation for filling the chamber with virgin air in step 1 of the next cycle. Therefore, this step may or may not be required as the situation dictates. It may also be required to remove any other gases that may be incidental to the reaction and also to eliminate these gases prior to filling the reaction chamber with virgin air. If significant amounts of nitrogen and oxygen-deficient air are mixed in the reaction chamber, then they would need to be evacuated prior to step 1 of the following cycle.

STEP 5 (FIG. 5)

The treated water is dumped by treated water outlet valve 20 and simultaneously replaced by air from the open air inlet check valve 14. If step 1 involves only atmospheric pressure, then this could be a simple evacuation of water to be replaced by air vented to the atmosphere. If the operation is such that air pressure is required in step 1 of the next cycle, then this air pressure could be used to assist in the rapid evacuation of the treated water. In order to avoid untreated water getting down below the area of treatment (such as in the drain line), it may be required to discontinue dumping water at a level prior to emptying the reaction chamber 10 completely. This was the reference above to the fact it might be desirable to have the treated water outlet above the level as shown in the drawings. It is also noted that if the reaction has resulted in gases in the water that will come out at atmosphere pressure, then some slight pressure may be required to prevent these gases from evolving and occupying the reaction chamber 10 after the water has been evacuated.

Those skilled in the art will understand there could be many different variations. E.g., instead of having the raw water enter the bottom of the vessel, it could be introduced through a spray header or sparge ring near the upper portion of the vessel. Also, to contact the air and the water, the water could be circulated and sprinkled through air, although I definitely prefer to bubble the air through the water. As mentioned before, there could be changes as to where the entrances and exits to the chamber might be located.

The basic invention as disclosed above could be combined with other chemical or physical treatments of the water. E.g., additives other than air could be added to the water and, furthermore, there could be centrifuging or filtering of the water. Specifically, there could be a drain at the top of the water to drain off a portion of the solids which might float to the top.

Examples

Some examples of tests conducted by this method are as follows:

Example 1

A mild brine from an aquifer in the vicinity of Monahans.

Pertinent Test Data

| | |
|---|---|
| Total Dissolved Solids, mg/l | 11,348 |
| Volume of Water in reaction chamber | 50% |
| Volume of compressed air in reaction chamber | 50% |
| Reaction pressure | 200 psi |
| Reaction time | 15 min. |
| Reaction temperature | 82°F. |

| | Raw Water | Treated Water |
|---|---|---|
| pH | 6.75 | 7.4 |
| Sulfite, mg/l | 0 | 58 |
| Hydrogen Sulfide, mg/l | 425 | 2.0 |
| Elemental Sulfur, mg/l | 0 | 354 |
| Per Cent Hydrogen Sulfide Removed | | 99.5% |

EXAMPLE 2

Distilled water treated with hydrogen sulfide and the ph raised slightly to hold it in solution.

Pertinent Test Data

| | |
|---|---|
| Volume of water in reaction chamber | 87.5% |
| Volume of compressed air in reaction chamber | 12.5% |
| Reaction pressure | 1,700 psi |
| Reaction time | 5 minutes |
| Reaction temperature | 75°F. |

| | Raw Water | Treated Water |
|---|---|---|
| pH | 7.9 | 4.45 |
| Sulfate, mg/l | 0 | 101 |
| Sulfite, mg/l | 0 | 145 |
| Hydrogen Sulfide, mg/l | 1,150 | 105 |
| Elemental Sulfur, mg/l | 0 | 660 |
| Per Cent Hydrogen Sulfide Removed | | 90.9% |

EXAMPLE 3

Distilled water treated with hydrogen sulfide and the pH raised slightly to hold it in solution.

Pertinent Test Data

| | |
|---|---|
| Volume of water in reaction chamber | 50% |
| Volume of compressed air in reaction chamber | 50% |
| Reaction pressure | 200 psi |
| Reaction time | 15 min. |
| Reaction temperature | 70°F. |

| | Raw Water | Treated Water |
|---|---|---|
| pH | 7.35 | 7.05 |
| Sulfate, mg/l | 0 | 0 |
| Sulfite, mg/l | 0 | 73 |
| Hydrogen Sulfide, mg/l | 400 | 6.5 |
| Elemental Sulfur, mg/l | 0 | 312 |
| Per Cent Hydrogen Sulfide Removed | | 98.4% |

EXAMPLE 4

Fresh water containing soluble iron.

Pertinent Test Data

| | |
|---|---|
| Volume of water in reaction chamber | 66% |
| Volume of compressed air in reaction chamber | 34% |
| Reaction pressure | 200 psi |
| Reaction time | 10 min. |
| Reaction temperature | 75°F. |

| | Raw Water | Treated Water |
|---|---|---|
| pH | 7.8 | 7.9 |
| Soluble Iron, mg/l | 97.3 | 10.3 |
| Percent Soluble Iron Removed | | 89.4% |

EXAMPLE 5

A finished sewage effluent.

Pertinent Test Data

| | |
|---|---|
| Volume of water in reaction chamber | 25% |
| Volume of compressed air in reaction chamber | 75% |
| Reaction pressure | 400 psi |
| Reaction time | 15 min. |
| Reaction temperature | 120°F. |

| | Raw Water | Treated Water |
|---|---|---|
| Chemical Oxygen Demand (COD), mg/l | 133 | 67.5 |
| Per Cent COD Removed | | 49.3% |

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific examples above do not point out what an infringement of this patent would be, but are to enable the reader to make and use the invention.

I claim as my invention:

1. The method of treating water in a pressure vessel comprising the following steps:
   a. filling the vessel with a predetermined amount of air,
   b. adding a predetermined amount of water to the vessel, thereby
   c. compressing the air,
   cc. recirculating the air from the top of the vessel and bubbling it through the water, thus d. intercontacting the air and the water for a predetermined time, then e. venting the air, and f. draining the treated water.

2. The invention as defined in claim 1 with an additional limitation of g. said predetermined time being at least about five minutes and not more than about 60 minutes.

3. The invention as defined in claim 1 wherein g. the vessel is initially filled with air at atmospheric pressure.

4. The invention as defined in claim 1 wherein g. the air is under pressure, said air not exceeding 1,500 psi.

5. The invention as defined in claim 1 wherein g. the air is compressed to a pressure no greater than 3,000 psi.

6. The invention as defined in claim 1 wherein g. the vessel is not vented to atmospheric pressure before the draining of the treated water is commenced.

7. The invention as defined in claim 1 wherein the raw water being treated contains about 400 mg/l hydrogen sulfide and treatment pressure is 200 psi and the treatment time is 15 minutes, the air volume being equal to the water volume.

8. The invention as defined in claim 1 wherein the water being treated contains about 100 mg/l soluable iron and the treatment time is 10 minutes and the air volume is one half the water volume.

9. The invention as defined in claim 1 wherein the water being treated is sewage and the treatment pressure is 400 psi and the treatment time is 15 minutes and the air volume is three times the water volume.

10. The invention as defined in claim 2 wherein j. the vessel is initially filled with air at atmospheric pressure.

11. The invention as defined in claim 2 wherein j. the vessel is not vented to atmospheric pressure before the draining of the treated water is commenced.

12. The invention as defined in claim 11 wherein k. the air is under pressure, said air not exceeding 1,500 psi.

13. The invention as defined in claim 12 wherein m. the air is compressed to a pressure no greater than 3,000 psi.

* * * * *